REPRODUCING COLOR TELEVISION CHROMINANCE SIGNALS

Filed March 30, 1956 3 Sheets-Sheet 1

INVENTOR.
WAYNE R. JOHNSON
BY
Lippincott + Smith
ATTORNEYS

Jan. 19, 1960 W. R. JOHNSON 2,921,976

REPRODUCING COLOR TELEVISION CHROMINANCE SIGNALS

Filed March 30, 1956 3 Sheets-Sheet 2

INVENTOR.
WAYNE R. JOHNSON
BY Lippincott + Smith
ATTORNEYS

Jan. 19, 1960 W. R. JOHNSON 2,921,976

REPRODUCING COLOR TELEVISION CHROMINANCE SIGNALS

Filed March 30, 1956 3 Sheets-Sheet 3

INVENTOR.
WAYNE R. JOHNSON
BY
Lippincott & Smith
ATTORNEYS

United States Patent Office 2,921,976

Patented Jan. 19, 1960

2,921,976

REPRODUCING COLOR TELEVISION CHROMINANCE SIGNALS

Wayne R. Johnson, Los Angeles, Calif., assignor, by mesne assignments, to Minnesota Mining & Manufacturing Co., St. Paul, Minn., a corporation of Delaware Application March 30, 1956, Serial No. 575,197

8 Claims. (Cl. 178—6.6)

This invention relates to the recording and reproduction of color television signals and particularly to the direct recording and reproduction of the chrominance signals of the general type specified in the "NTSC" system which is now the standard for the transmission of color television signals within the United States.

In accordance with this NTSC system a signal representative of the luminance of the successive picture points, irrespective of their color, is transmitted, together with sidebands resulting from the modulation upon a carrier of a common frequency of two chrominance signal components, designated as "I," and "Q." The carriers upon which the two chrominance signals are modulated are in phase-quadrature; the sidebands resulting from both modulations are added in transmission, resulting, effectively, in a single train of signals modulated in both phase and amplitude.

At the beginning of each line of the scanning which traces the picture there is transmitted a burst of the carrier frequency. This is used to establish the phase of a carrier frequency oscillator at the receiver; the oscillations of this generator are resolved into orthogonal components which are employed in separate demodulators or phase sensitive detectors to recover the chrominance signals. The hues reproduced at the receiver are dependent upon the phases of the sideband frequencies as compared with the periodic bursts of the comparison, color-carrier frequency; the intensity at which these hues are reproduced depends upon the amplitude of the sideband frequencies. The color carrier is of a frequency which is an odd multiple of one-half of the line frequency used in a scanning operation and therefore, as is now well known, neither the carrier itself nor its sidebands are present in appreciable amounts in the luminance signal and are substantially invisible in the reproduced signal. In accordance with present standards of transmission the frequency of the color subcarrier is approximately 3.58 mc., and which for convenience will be so designated.

The present methods of tape recording color television signals involve either direct recording of the luminance signal on a single track, which requires that the tape be progressed through the recording and playback apparatus at very high speeds and consumes very large quantities of the tape, or some method of frequency division which effectively shifts the frequencies of the higher-frequency components into a lower band. Since the 3.58 color carrier lies very near to the top of the nominal 4 mc. band occupied by a standard television signal, the carrier itself is one of the frequencies which is shifted in dividing the frequency band.

An error in relative phase between the reference-phase bursts and the phase of the chrominance signal of about 5 degrees can make a perceptible difference in hue of the reproduced colors. Such a shift in phase amounts to a time difference of approximately 0.004 microsecond. This is a degree of accuracy in time synchronization which is greatly in excess of anything required in any other part of the entire picture reproducing system.

The methods of stepping down the frequencies to be recorded in band-splitting systems involve processes which are closely related to heterodyning or modulation. The stepping-down in recording and stepping-up in reproduction frequently are accomplished by different oscillators, located in different locations; in any event the two processes are separated in time, so that unless the oscillators used are stabilized to a degree which is not ordinarily accomplished, except perhaps in the case of astronomical clocks, phase discrepancies will normally occur in the reproduced signals. Hence it has been customary to demodulate the chrominance signals and either record the various primary color components separately or else record the I and Q components, which are modulated upon the color-carrier, separately. This means that either three or two additional tracks must be provided for the chrominance signals, each track involving the equipment necessary for a complete recording and reproducing channel. The ability to eliminate a single channel will therefore eliminate an amount of equipment which is well worthwhile saving.

In addition to the problem of maintaining accurate phase relationship between the color burst and the chrominance signals is the problem of maintaining the color-carrier frequency itself accurate to the required degree. Methods of high frequency flutter correction on the tape exist which are satisfactory insofar as the less stringent synchronization requirements are concerned. If the chrominance signal is to be recorded as such it is necessary, however, that the carrier frequency be held constant in reproduction, to a degree which present techniques render impracticable. The most difficult errors to correct low frequency flutter; degrees of correction which would be entirely satisfactory for most purposes may still involve deviations from the average rate of the progression of tape which cumulatively may amount to as much as 100 microseconds. Some color receivers will not follow such wide deviations even though they occur at rates which are very low in comparison to the line scanning frequency.

The broad object of the present invention is to provide a method which will permit the recording and reproduction of the chrominance signal as such. Among the objects contributory to this end are to provide a method of shifting the frequency-band occupied by the chrominance signals to a more readily recorded value and then reshifting the reproduced signals back to their proper frequency band without introducing frequency modulation into the reproduced carrier or phase discrepancies between the synchronizing burst and the chrominance signals themselves; to provide a method of and means for maintaining the frequency of a chrominance subcarrier, which has been recorded and reproduced, with substantially the same accuracy as is attainable with a stabilized, crystal-controlled oscillator; and to provide means and methods of recording color television signals which reduce by at least one the number of tracks necessary for carrying the combined luminance and chrominance information.

Normally the present invention will be employed in addition to the methods of flutter correction necessary for the satisfactory recording and reproduction of monochrome television images. Theoretically it is possible to employ the method to recover chrominance signals which have already been mixed with luminance signals, recording them on the same track. Usually, however, recordings are made at the point of origin of television programs, and at this point there is normally a channel available that carries unmixed chrominance signals. Because of the extremely rigid phase and frequency requirements of the chrominance signals it is preferable to subject them to as little filtering or like operations as possible and therefore the preferred method is to record them upon a separate track.

While it is usually preferred to employ the invention in connection with band-splitting methods which reduce the necessary speed of the recording medium, it should be apparent that the problems of frequency and phase instability of the reproduced signal are present even where the "brute force" method of recording and reproduction are used, and the high frequencies are obtained by speeding up the tape to double that required by band-splitting procedures. The present invention is applicable whichever system is used.

In accordance with the invention the entire chrominance signal, including the synchronizing burst of the carrier frequency, is intermodulated with or heterodyned against a controlled, constant frequency to produce a difference-frequency sideband. If no band-splitting system is used this first intermodulation can be accomplished after the signal has been reproduced; since the intermodulation is an essential step of the method in any event, however, it is usually preferable to perform this step prior to the recording. The difference frequency is so selected that it falls in the portion of the reproduced band giving maximum reproducer response; i.e., well above the low frequency cut-off imposed by the fact that the amplitude of the reproduced signal is proportional to the rate of change of magnetism of the tape, and well below the high frequency cut-off imposed by aperture effect. With a tape running at somewhere in the neighborhood of 100 inches per second and capable of reproducing satisfactorily up to 9000 cycles per inch, a suitable carrier frequency, as represented in the difference-frequency sideband resulting from the intermodulation, will be in the neighborhood of 500 kc. The intermodulating frequency chosen can therefore be either in the neighborhood of 3 mc. or 4 mc.; the exact frequency in this case is not particularly important. It is preferred, however, to employ an intermodulating frequency which is higher than the chrominance carrier frequency, since when this is done the aperture effect is sufficient to remove all unwanted sidebands and it will do this without producing any phase distortion of its own.

The frequency-shifted signal, whether modulated on the constant-frequency carrier before or after recording and reproduction, will be frequency modulated by any changes in relative speed of the recording tape between the recording and reproduction processes. The major frequency shifts due to this cause represent relatively low frequency changes; the principal changes at frequencies of the order of magnitude of 20 cycles per second, the maximum frequency shift at this rate will therefore occur in somewhere in the neighborhood of $\frac{1}{40}$ of a second, or during an interval wherein roughly 400 lines are scanned. During any single line, the reproduced color-carrier frequency may therefore be considered a constant, even though it may be in error as to its absolute value. During such one-line interval, the phase of the chrominance signal will be substantially correct, within very narrow limits, with respect to the substantially constant but slightly erroneous frequency.

The reproduced chrominance signal is then intermodulated with a locally generated oscillation of the same nominal frequency as that used to produce the original frequency shift, but which is variable, in accordance with the magnitude and polarity of a suitable control voltage, to yield as a sum frequency a signal of the same nominal frequency as the original chrominance signal. The portions of the signal thus reconstructed which represent the synchronizing bursts are time-selected and are compared in a discriminator or phase-sensitive detector with a locally generated fixed frequency signal of the exact value desired for the color carrier, substantially 3.58 mc. per second. The output of the discriminator is proportional in magnitude and polarity to the cumulative discrepancy in phase between the reconstituted chrominance signal and the fixed frequency signal with which it is compared. The resultant error signal is applied as the control signal which varies the frequency intermodulated with the chrominance signal. A high degree of amplification is introduced in the feedback loop between the reproduced chrominance signal and the oscillator generating the demodulating signal; this amplification can be accomplished either before the phase discriminator or, as by a D.C. direct coupled amplifier, between the phase discriminator and the variable frequency oscillator, or both. With a large loop gain the phase and frequency of the resulting signal can be held constant to as high a degree of accuracy as may be desired; the residual error, which is inescapable in any feedback system, is reduced to a fraction of the initial error which is inversely proportional to the loop gain, and the latter can be made as large as may be desired.

The above method will be further explained in connection with the detailed description which follows of various forms of the apparatus whereby it may be accomplished, these descriptions being illustrated by the accompany drawings wherein.

Figure 1:
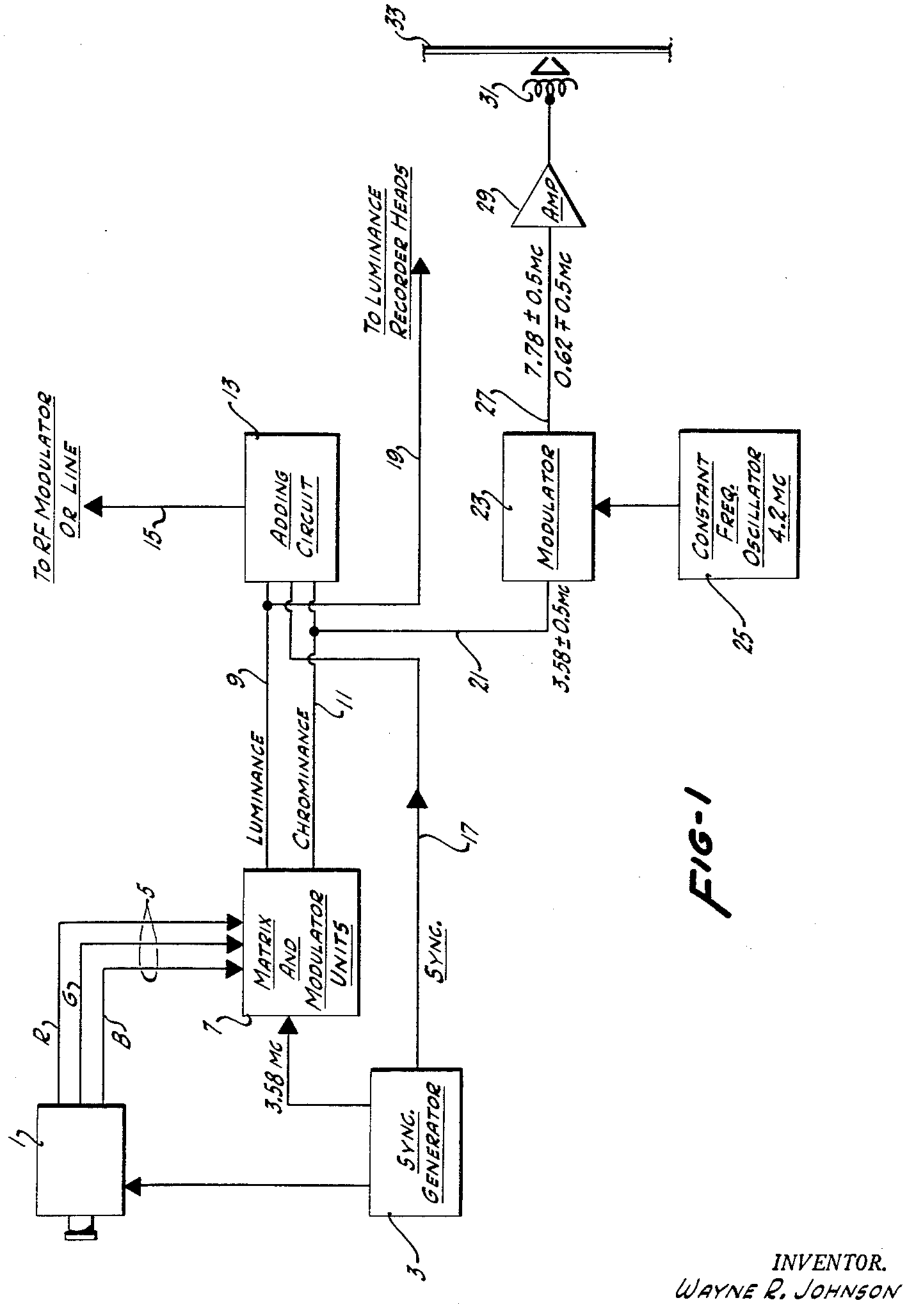
Fig. 1 is a block diagram of recording apparatus adapted for use of the invention where a band-splitting system of recording color television signals is employed.

Equipment for developing recorded, frequency-shifted signals in accordance with the present invention is shown in highly symbolic, block form, in Fig. 1. In this diagram a tricolor camera 1 is supplied with scanning and blanking frequencies from a sync generator 3. The resulant tricolor signals, representing red, green, and blue color components are carried by lines collectively designated as 5 and specifically designated by the characters R, G and B, to matrix and modulator units 7. In these units the signals are combined in proper proportion to develop the so-called "I" and "Q" components, which are modulated, in quadrature, upon the approximately 3.58 mc. color carrier which is also supplied from the sync generator 3. The luminance and chrominance signals are fed through the lines 9 and 11 respectively to an adding circuit 13 and thence, through line 15, to transmitter or line, as the case may be, provided the signals are being broadcast simultaneously with their recording. Line and frame synchronizing signals from the generator 3, are added to the luminance and chrominance signals in the adding circuit 13, being supplied thereto through a line 17.

A branch 19 from line 9 supplies the equipment for recording the luminance signal simultaneously with, and on the same tape as, the chrominance signal with which the present specification is primarily concerned. This luminance-recording equipment is not shown, since it is not directly concerned with the present invention and would merely serve to confuse the diagram.

The chrominance signal is taken off of the chrominance line 11 through a branch circuit 21 that connects to one input of a modulator 23. This modulator can be of either the balanced or unbalanced type and may employ either contact rectifiers or vacuum tubes as its active elements. In it the chrominance signal is modulated upon a constant frequency oscillation generated by an oscillator 25, preferably crystal controlled, which develops a frequency differing from that of the chrominance or color carrier by the desired frequency of the carrier as it is to be recorded. The indicated frequency of this oscillator is 4.2 mc., giving a difference-frequency from the color carrier of .62 mc. The sum frequency of approximately 7.78 mc. will also be developed in the modulator 23, with the sidebands on either side of the nominal frequencies of 0.62 and 7.78 mc. of $\mp$ and $\pm 0.5$ mc. respectively, together with the 4.2 and 3.58 mc.

frequencies, if the modulator is of the unbalanced type. All of these frequencies are supplied through line 27 to a recording amplifier 29, and thence to a magnetic recording head 31 which imposes them upon the tape, symbolized at the reference character 33. Because of the aperture-effect cut-off all except the lower sideband frequencies are eliminated from the recording, it being assumed in the present instance that the over-all recording and reproducing equipment has a cut-off somewhere between 1 and 2 mc.

If desired, the constant-frequency oscillator 25 could be operated at a frequency sufficiently below the color-carrier frequency to give the proper difference frequency for satisfactory recording. If, for example, the frequency of the oscillator were 2.96 mc., the lower sideband would occupy precisely the same bandwidth as where the 4.2 mc. frequency is used. The carrier frequency would appear in the upper sideband in this case as 6.54 mc., and as in the preceding case the carrier, the heterodyning frequency and the original chrominance frequency centered on 3.58 mc. would all fail to reproduce. The only difference would be that the sidebands would be direct instead of inverted, as it is where the 4.2 mc. frequency is used. As far as the recording is concerned, there would be no difference but the use of the lower frequency imposes more restrictions on the reproducing equipment than does the use of the higher one and therefore the higher frequency is preferred.

Figure 2:
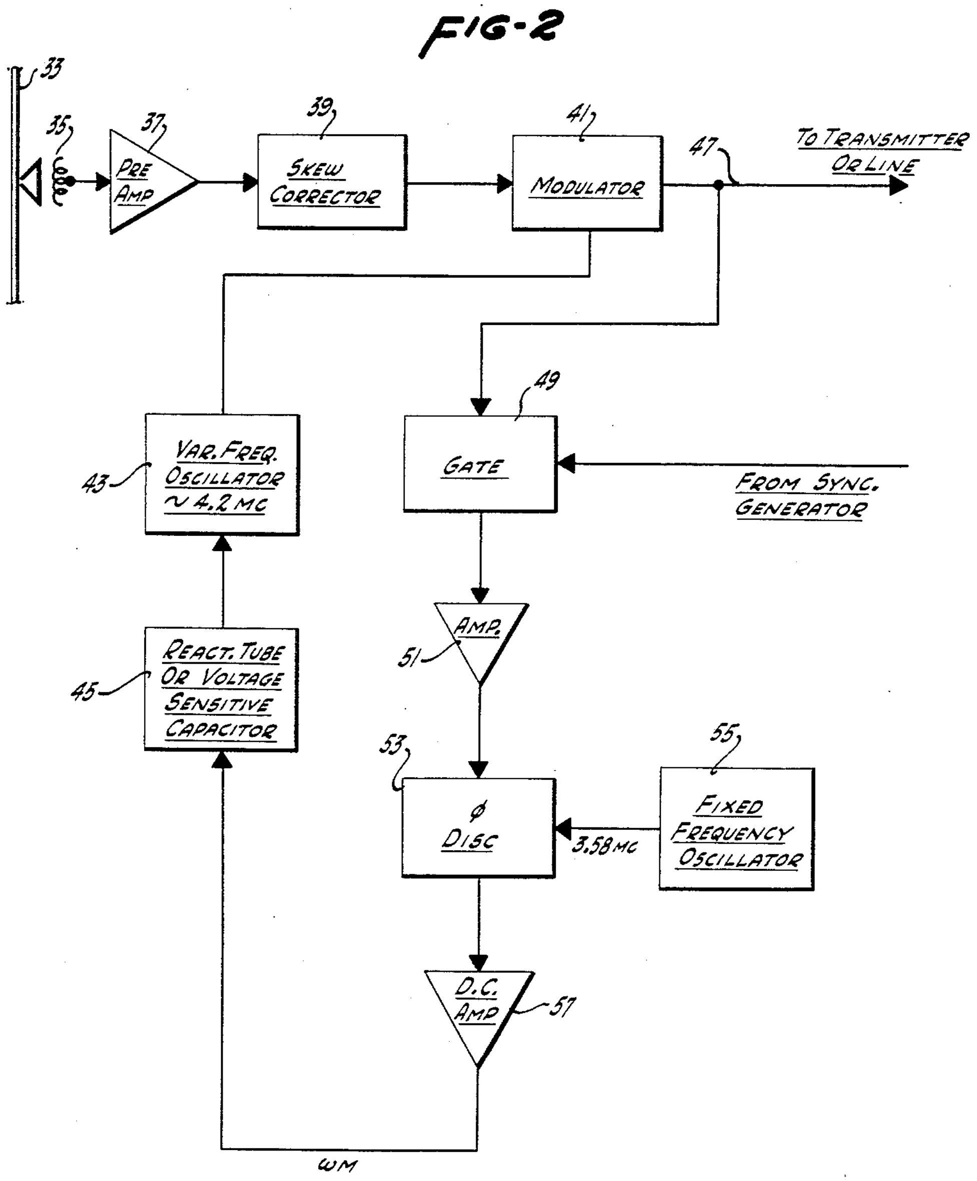
Fig. 2 is a block diagram of reproducing equipment for signals recorded by the apparatus of Fig. 1.

In reproduction, equipment such as is shown in Fig. 2 may be used. The tape carrying the recorded signals is designated, as before, by the reference character 33. It is progressed past a playback transducer head 35 at a speed which will give to the color-carrier frequency the same average value as that at which it was recorded. Known methods of control can maintain the tape speed at a value which will maintain this average frequency correct to within extremely close limits, taking into account such difficult-to-control factors as tape stretch or expansion and varying supply voltage or frequency to the drive mechanism.

Because of inevitable mechanical imperfections, however, the instantaneous tape speed may vary, giving rise to frequency modulation superposed upon the phase modulation of the chrominance signals. Of the factors giving rise to such frequency modulation or flutter, the most difficult to cope with is that due to eccentricity of the winding of the tape upon the pay-out reel. The frequency modulation thus imposed is approximately sinusoidal; due to the constantly varying diameter of the coil upon the reel as the program progresses, it varies in frequency from a minimum at the start of the program to a maximum when the tape on the reel is practically exhausted. There may be a smaller component due to the pick-up reel which varies in frequency in the opposite direction, but this component is usually so small as compared to that due to the pay-out reel that it may be neglected in considering the magnitude of the effect involved. The flutter frequencies due to this cause are usually in the lower range of audibility or even below audibility; 20 cycles can be taken as about an average of their general order of magnitude. The total amplitude of the flutter can be held, even with the techniques ordinarily used in sound recording, to a value of less than one-half of one percent. Precautions taken in television recording can reduce this amount of flutter materially, to something in the neighborhood of $\frac{1}{10}$ of one percent, or in the neighborhood of 3600 cycles per second frequency deviation of the 3.58 mc. color carrier.

The signals, carrying an undesired frequency modulation of this possible total amplitude, are first supplied to a pre-amplifier 37. They may next be passed on to a skew corrector 39, the function of which is to correct phase discrepancies between the multiple tracks of the recording but which need not be described in detail since it is not directly concerned with the present invention and may, under certain circumstances, be entirely omitted, in which case the signal goes directly from the pre-amplifier 37 to a modulator 41. The input circuit of this modulator from the pre-amplifier should be balanced to exclude the input frequencies from its output.

In the modulator the signals reproduced from the tape are intermodulated with an oscillation from a variable-frequency oscillator 43, the nominal frequency whereof is the same as that of the constant frequency oscillator 25 used in the recording, but whose instantaneous frequency may be varied, over a range at least equal to that attributable to the flutter modulation of the signal, by an externally applied control voltage. Such oscillators are well known; the frequency control may be exercised by a reactance tube bridged across a frequency-controlling tank circuit. Another type of oscillator which may be similarly controlled is one wherein a voltage-sensitive capacitor is similarly so bridged, the capacitance which enters into the tank circuit frequency equation varying in accordance with a D.C. bias applied across it. Of the two types of oscillators mentioned, that responding to changes in reactance of a reactance tube is best known, such an arrangement being incorporated in substantially all television receivers for the control of the line-scanning frequency; the other type is, however, also available. In the diagram the control device is indicated by the reference character 45, and for convenience will be referred to hereinafter as a reactance tube.

Reverting to the modulator 41, it is preferably, but not necessarily of the double-balanced type which suppresses the carrier frequency from the oscillator 43. If the frequency of this oscillator is lower than the 3.58 mc. frequency of the chrominance character carrier a double-balanced modulator is necessarily used in this position, since the carrier in this case lies within the band of frequencies which will be reproduced by the equipment following the modulator. If the higher frequency, of 4.2 mc. in the illustrative case, is used in the modulation processes, a balanced type of modulator 41 may not be necessary since the 4.2 carrier frequency should be excluded by the sideband filters used in transmitters. The sum frequencies will be excluded in either case, as far beyond the transmitted band. The only important frequencies in the output line 47 from the modulator will then be those of the re-established chrominance signals.

A branch line from the line 47 connects to a gate 49 which is usually operated by the blanking pulse from a sync generator. If necessary this pulse can be supplied from either the chrominance signal itself or from one of the other tracks of the recorded signal; since, however, where such signals are to be reproduced the sync generator is practically always available, it is usually better practice to tie-in the recorded signals with it and not attempt to record the line and field synchronizing pulses, but to supply them locally.

The chrominance-synchronizing burst is, of course, recorded on the tape 33. The gate operates to permit the passage of the burst, which is preferably increased in amplitude by an amplifier 51 and thence supplied to a discriminator or phase-sensitive detector 53. In the discriminator the frequency of the signal burst is compared with the desired color-carrier frequency. It is possible to use as the discriminator a frequency-discriminator, if it is of the crystal type and very sharply tuned. Preferably, however, a phase discriminator or phase-sensitive detector is used, wherein the frequency of the pulse is compared with that of a fixed frequency oscillator 55, operating at the exact color-carrier frequency of approximately 3.58 mc.

The type of phase discriminator used may be substantially identical with those employed for the control of the line frequency scanning oscillators in the majority of television receivers; in general, one of the signals to be compared appears across a center tapped inductor (usually the secondary of a transformer) the two halves of which form adjacent arms of a bridge circuit, each of these arms also including a rectifier. The two rectifiers are so poled as to pass current in the same direction with reference to the inductor, i.e., either toward or away from its winding as the case may be. The two other arms of the bridge are formed by high-resistance, balanced resistors. A capacity is bridged across the diagonal of the bridge formed by the two resistive arms. The signal which is to be compared with that appearing across the inductor is applied across the other diagonal of the bridge, between the center tap of the inductor winding and the junction between the two resistive arms. If the two compared signals are exactly in quadrature the voltage drops across the two resistors will be equal and opposite and no net voltage will appear across the resistors in series; if not exactly in quadrature the drops will be unequal and a net voltage will appear across the two arms, the direction of this voltage depending upon which of the two compared signals leads (or lags) the normal 90 degree phase-relationship. The time constant of the circuit comprising the two resistors and their parallel capacity should be long enough so that no material change in potential across the device will occur in the intervals between the synchronizing bursts.

The very low frequency flutter signals resulting from discrepancies in phase between the frequency of the oscillator 55 and the synchronizing bursts are preferably increased in amplitude by a direct-coupled D.C. amplifier 57, and then applied as a control voltage to the reactance tube (or to bias the voltage sensitive capacitor) which controls the variable-frequency oscillator, in such sense that if the phase of the bursts as they appear in lead 47 advances with respect to the phase of oscillator 55 the frequency of oscillator 43 is decreased, whereas if the burst frequency is tending to lag the oscillator 43 is increased in frequency. The result is that the frequency of the reproduced chrominance carrier is held substantially constant, the frequency of oscillator 43 varying in the same direction as the variations in frequency of the reproduced signal, to keep their difference at a constant value.

As in all cases of negative feedback, the accuracy of the control applied is a direct function of the gain in the feedback loop. In the case shown this gain is supplied by the amplifiers 51 and 57, and by the sensitivity of the reactance tube or equivalent device 45. Because the frequency involved is fairly high and the tuning inductance and capacity correspondingly small, the changes in voltage required to effect the necessary change in frequency are also small. Either amplifier 51 or 57 can, of course, be omitted, if the gain of the other is sufficiently high to hold the frequency deviation within the desired limits. Theoretically, it would even be possible to omit both if the level of the signal in line 47 and the sensitivity of the control were both sufficiently great. Ordinarily, however, amplification will be supplied in one or both of the two positions in order to make the frequency controls sufficiently rigid.

What the extent of the control that must be applied may be can be shown by an illustrative example. Using the currently accepted standards, the carrier frequency of 3.58 mc. is equal to approximately 227 cycles per line. Assuming that the flutter frequency is sinusoidal, this frequency as it appears at the input of modulator 41 can be expressed as:

$$\omega=\omega_0+\Delta\omega \sin \omega_m t$$

where $\omega$ is the instantaneous carrier frequency, $\omega_0$ is the average frequency and $\Delta\omega$ the maximum frequency deviation. $\omega_m$ is the modulating or flutter frequency, all frequencies being expressed in terms of radians per second.

The cycles per line of the color carrier being taken at 227, the variation in tape speed of $+0.1$ percent is equivalent to something less than 0.3 cycle per line. If the modulation rate is 20 cycles per second, in a time $t$ equal to one scanning line of $\frac{1}{15750}$ second, $\omega t$ is equal to 0.008 radian, very nearly. The maximum change in phase per line will occur where $\omega_m t=n\pi$ where $n$ is an integer, and at this part of the cycle the angle and its sine can be taken as equal. The maximum change in phase per line to be expected is therefore $0.3\times0.008$ radian or something less than $\frac{1}{10}$ of a degree, which is far too small to cause any color distortion. With the arrangement shown the correction applied to each line will be substantially that at which would give the proper phase relation to the preceding line, provided the gain in the feedback loop is sufficiently high. For all practical purposes, therefore, the control may be considered to be absolute as far as frequency and phase are concerned. Even if the frequency of the flutter modulation were increased by a factor of 5, and the percentage of frequency deviation raised to one-half of one percent, the deviation in a single line would still be less than $2\frac{1}{2}$ degrees at the time a new correction voltage was applied as a result of a new error signal from the synchronizing pulse. Since it will be at once evident that it is not the deviation in either frequency or phase in any one line which causes difficulty, but the cumulative differences, over a number of lines, it will be seen that the present invention is capable of giving a control which is substantially perfect.

Figure 3:
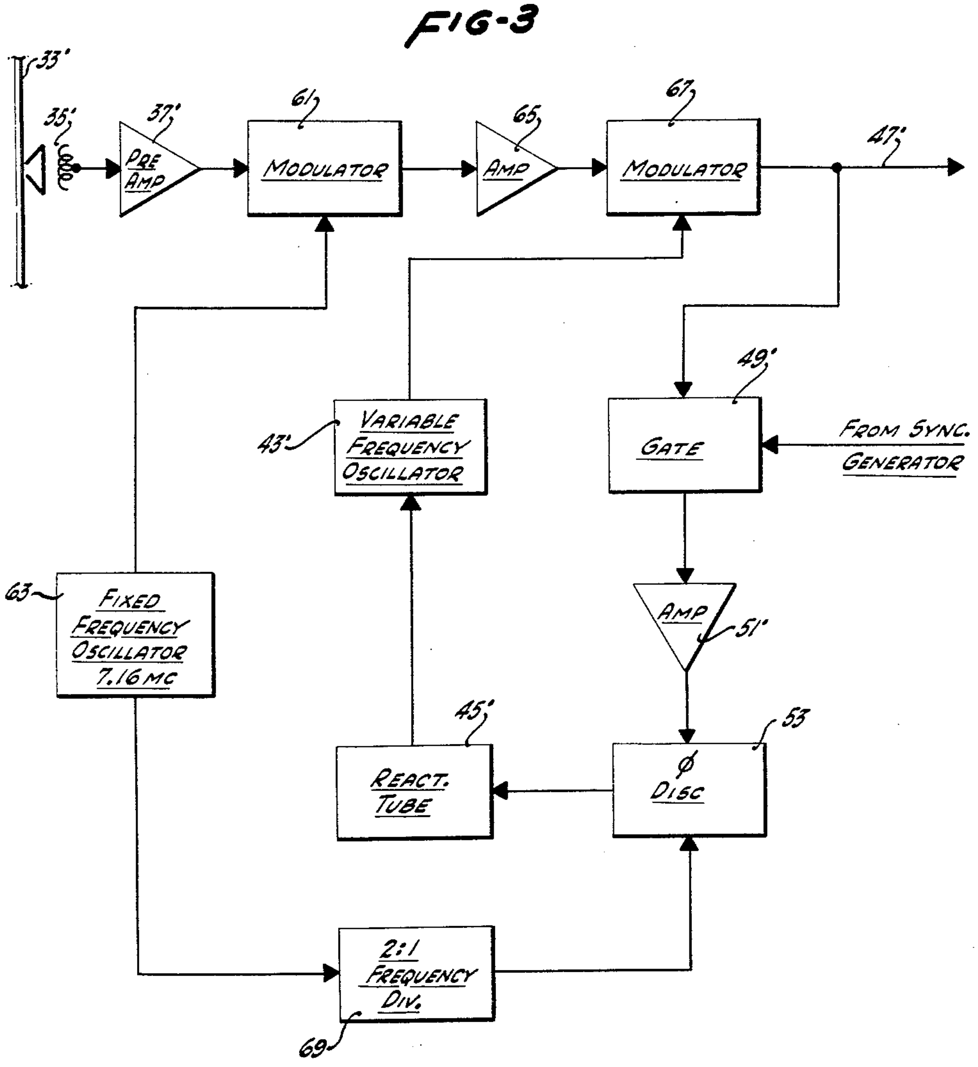
Fig. 3 is a similar block diagram of apparatus for reproducing directly recorded chrominance signals.

In Fig. 3 is shown equipment for applying the method of this invention to a signal recorded at such tape speed as will permit direct recording of the color carrier frequency. In this figure each element of the equipment having a direct counterpart in Fig. 2 is designated by the same reference character as in the former figure, distinguished by accents. Up to and through the preamplifier 37 the equipment may be identical, except as to the frequency band which it will pass which must, in this case, be equal to the full width of the television channel. From the preamplifier 37' the signal goes to a modulator 61, the other input of which is supplied from a fixed frequency oscillator 63. The frequency of oscillator 63 may be that of the color carrier itself, but preferably is an exact multiple or sub-multiple thereof; preferably a multiple is used for the same reason as in the case where bandsplitting is used, to keep the oscillator frequency out of the resultant signal and to spread the sidebands further apart. In the illustrative case the assumed frequency is twice the color carrier frequency or 7.16 mc. The modulator 61 should be in any event of the balanced type, insofar at least as the input from preamplifier 37' is concerned.

The output of modulator 61, occupying the same band as it did before the modulation process but with its sidebands reversed, passes through a buffer amplifier 65, and thence to a second modulator 67 which should also be of the balanced-input type. The second input to modulator 67 is from a variable frequency oscillator 43', controlled by a reactance tube 45'. The gate 49', amplifier 51' and discriminator 53' may be identical with those of Fig. 2; they act in precisely the same manner to accomplish the same purpose.

In the form shown the reference bursts are discriminated against a signal which is also derived from the fixed frequency oscillator 63. The signal is supplied to a 2:1 frequency divider 69, thus giving the 3.58 mc. frequency which establishes the norm for the output through lead 47'.

Although it is usually preferable to record the chrominance signal on a separate track this is not an essential of the invention. If, in the case of the invention as practiced in accordance with Fig. 3, for instance, the chrominance signal has been added to the luminance signal prior to recording, the operations which have been described can be applied to the signal as a whole. Because at the time the gate 49' operates only the synchronizing burst is present, no filter is necessary to separate the color-carrier frequency from the remainder of the signal. The output signal in lead 47′ should therefore be substantially identical with the input signal except for very slight corrections in frequency of all of the components thereof, luminance as well as chrominance. Every modulation and demodulation process, however, results in some signal degradation, however slight, and for this reason separate recording is preferred. Similarly, in case the method is performed in accordance with a bandsplitting procedure such as is used in connection with the apparatus of Figs. 1 and 2 the chrominance signal can similarly be mixed with the luminance signal provided the method of bandsplitting used in the luminance signal is such as to permit this, which may or may not be the case.

Referring to Fig. 3, although a multiple of the color-carrier frequency is preferred as that of the fixed frequency oscillator 63, provided double balanced modulators 61 and 67 are used, a sub-multiple frequency may be employed. This would usually be the first sub-multiple or 1.79 mc. approximately. In this case the frequency divider 69 would be replaced by a frequency doubler. It is even possible to use the color-carrier frequency itself as that of the fixed frequency oscillator 63, omitting element 69 altogether, in which case it is also necessary to use double-balanced modulators for both demodulating and modulating purposes.

Again, entirely separate oscillators can be used to supply modulators 61 and the comparison frequency of 3.58 mc. to supply the discriminator. If both oscillators are crystal controlled and thoroughly stabilized, the relative discrepancies in frequency will be to slight to be worth considering.

From the above it will be evident that there are numerous ways in which the invention may be practiced. The details which have been described, such as specific frequencies or types of equipment for performing various steps are therefore not intended as limitations upon the scope of the invention, all intended limitations being specifically expressed in the following claims.

What is claimed is:

1. In a system for recording and reproducing information in the form of the instantaneous phase displacement between bursts of reference signals and information signals, first means responsive to the reference signals for shifting the frequency of the reference and information signals in a first direction by a particular frequency deviation, second means coupled to said first means for shifting the frequency of the shifted signals from said first means in a direction opposite to said first direction by a variable frequency deviation, means coupled to said second means for detecting any variation in frequency of said reference signals, and means coupled to said detecting means and said second means for varying the frequency deviation of said second means in accordance with the detected variation in frequency of said reference signals and in a direction for stabilizing the reference frequency signals.

2. Apparatus for compensating the phase distortion introduced in a band of high frequency signals by a recording and reproducing system in accordance with signals of a stabilized frequency, means responsive to the band of high frequency signals and to the signal of stabilized frequency for intermodulating the band of high frequency signals with the signal of stabilized frequency to produce a difference frequency sideband lower in frequency than said band of high frequency signals, means for generating a variable frequency signal having an average frequency which is the same as the frequency of said signal of stabilized frequency, means coupled to said generating means and to said intermodulating means for intermodulating the signals of said difference frequency sideband with said variable frequency signal to produce a difference frequency sideband having adjusted frequency signals in the high frequency band, and means coupled to said second mentioned intermodulating means for periodically sampling said adjusted frequency signals to provide an error signal for introduction to said variable frequency generating means whereby the phase of the adjusted frequency signal is compensated for any distortion introduced in the system.

3. Apparatus for compensating the phase distortion introduced in a recording and reproducing system wherein information is conveyed by the phase relationships between bursts of reference oscillations and the instantaneous phase of information oscillations following the bursts of reference oscillations and wherein first oscillations of constant frequency are included to provide such compensation, means responsive to the oscillations of constant frequency and to the reference oscillations for intermodulating the reference oscillations and the constant frequency oscillations to produce a first difference frequency sideband for recording on a medium, means for generating a variable-frequency oscillation of the same average frequency as the constant frequency, means coupled to said generating means for intermodulating said first difference frequency sideband as reproduced from the medium with said variable frequency oscillation to provide a second difference frequency band, means for supplying a second constant frequency oscillation related in frequency to the first constant frequency oscillations, means coupled to said supplying means for comparing the phase of the reference oscillations as they appear in said second difference frequency sideband with the phase of said second constant frequency oscillations to produce an error signal varying in amplitude and polarity in accordance with the magnitude and direction of variations in phase of the reference oscillations of said second difference sideband with respect to said second constant frequency oscillations, and means coupled to said comparing means for applying said error signal to vary the frequency of said variable frequency oscillation from said generating means in a sense to counteract the variations in phase of the reference oscillations in said second difference sideband.

4. In a system for recording and reproducing information in the form of the instantaneous phase relationship between bursts of reference signals and information signals both of which have signal frequencies over the high-frequency cut-off of the recording and reproducing apparatus, first means for shifting the frequencies of the reference and information signals by a predetermined frequency deviation to a frequency band below the high frequency cut-off of the recording and reproducing apparatus, means coupled to said first means for introducing the shifted reference and information signals to the recording and reproducing apparatus, second means coupled to the recording and reproducing apparatus for shifting reproduced reference and information signals by a variable frequency deviation in the opposite direction from the deviation by said first means, and means coupled to said second means for varying the frequency deviation of said second means by an amount related to the variation in frequency of successive bursts of reference signals from said second means to obtain a compensation for phase modulation introduced by the recording and reproducing apparatus.

5. In a tape-recording and reproduction of color television signals wherein chrominance information is conveyed by the phase-relationship between periodic bursts of color-carrier frequency oscillations of constant phase and the instantaneous phase of oscillations of said color-carrier frequency transmitted concurrently with luminance information; apparatus for compensating for phase distortion introduced into the reproduced chrominance signals by the recording and reproduction processes including: first means for intermodulating all of said color-carrier frequency oscillations of the signal frequency to be recorded on a constant frequency oscillation to produce a difference-frequency sideband; second means for generating a variable-frequency oscillation of the same average frequency as said constant-frequency oscillation; third means coupled to said generating means and to said intermodulating means for intermodulating said difference-frequency sideband with said variable frequency oscillation to produce a upper-frequency sideband of approximately said color-carrier frequency; fourth means for generating a fixed-frequency oscillation of color-carrier frequency; fifth means coupled to said fourth means and to said third means for comparing the phase of said bursts as they appear in said upper-frequency sideband with the phase of said fixed-frequency oscillation to produce an error signal varying in amplitude and polarity in accordance with the magnitude and direction respectively of variations in phase of said bursts of upper-sideband frequency oscillation with respect to the phase of said fixed-frequency oscillation; and sixth means coupled to said fifth means for applying said error signal to vary the frequency of said variable-frequency oscillation in such sense as to counteract said variations in phase of said bursts of upper-sideband frequency.

6. In a system for recording and reproducing information in the form of the instantaneous phase displacement between bursts of reference signals and information signals, first means for shifting the frequency of the reference and information signals in a first direction by a predetermined frequency deviation, second means coupled to said first means for shifting the frequency of the shifted signals from said first means in a direction opposite to said first direction by a variable frequency deviation, means coupled to said first means for detecting any variation in frequency of said reference signals, including periodically enabled gating means coupled to said second means for transmitting said reference signals and not said information signals, a reference frequency source, and phase comparing means coupled to said gating means and to said source for producing an error signal varying in amplitude and polarity only when said reference signals are received transmitted from said gating means, with the variation being in accordance with the magnitude and direction of variations in phase of said transmitted reference signals with respect to the phase of the reference frequency from said source, and means coupled to said phase comparison means for varying the frequency deviation of said second means in accordance with said error signal.

7. A stabilization system for apparatus utilized to record and reproduce information represented by the instantaneous phase displacements between bursts of reference signals and information signals following each of the bursts of reference signals, means coupled to the recording and reproducing apparatus for separating reproduced bursts of reference signals from the reproduced information signals following each of the reproduced burst of reference signals, means coupled to said separating means for stabilizing the phase of each of the separated bursts of reference signals, and means coupled to said stabilizing means and to said recording and reproducing apparatus for adjusting the phase of the reproduced information signals following each of the separated bursts of reference signals in accordance with the stabilization of the separated bursts of the preceding reference signals.

8. A stabilization system for apparatus utilized to reproduce information in the form of the instantaneous phase displacement between reference signals and information signals, means coupled to the reproducing apparatus for determining the deviation in phase introduced by the reproduction of the reference signals, and means coupled to said determining means for adjusting the phase of both the reproduced reference signals and the reproduced information signals in accordance with the de.ermined deviation in phase of the reference signals by said determining means.

References Cited in the file of this patent

UNITED STATES PATENTS

| | | |
|---|---|---|
| 2,306,435 | Graham | Dec. 29, 1942 |
| 2,353,631 | Bliss | July 18, 1944 |
| 2,517,808 | Sziklai | Aug. 8, 1950 |

OTHER REFERENCES

Recording TV on Magnetic Tape, Osbahr, Tele-Tech and Electronics, January 1954.

Progress and Difficulties in Television Recording, Thomasson, January 1955, Communications and E.ectronics, pages 57 to 59.

A Short History of Television Recording, February 1955, SMPTE, vol. 64, pages 72 to 76.